(12) United States Patent
Ifflaender

(10) Patent No.: US 7,050,473 B2
(45) Date of Patent: May 23, 2006

(54) PUMPING LIGHT SOURCE FOR LASER-ACTIVE MEDIA

(75) Inventor: Reinhard Ifflaender, Schramberg (DE)

(73) Assignee: TRUMPF Laser GmbH + Co. KG, Schramberg (DE)

(*) Notice: Subject to any disclaimer, the term of this patent is extended or adjusted under 35 U.S.C. 154(b) by 228 days.

(21) Appl. No.: 10/791,664

(22) Filed: Mar. 1, 2004

(65) Prior Publication Data

US 2004/0223530 A1    Nov. 11, 2004

Related U.S. Application Data

(63) Continuation of application No. 10/118,594, filed on Apr. 8, 2002, now abandoned.

(30) Foreign Application Priority Data

Feb. 22, 2002    (DE) ................ 102 08 585

(51) Int. Cl.
    *H01S 3/22* (2006.01)
(52) U.S. Cl. .................... 372/55; 372/29.013
(58) Field of Classification Search .............. 372/55, 372/58, 61, 57, 56, 72
    See application file for complete search history.

(56) References Cited

U.S. PATENT DOCUMENTS

| | | | |
|---|---|---|---|
| 3,621,458 A | 11/1971 | Cabezas et al. | |
| 4,074,208 A | 2/1978 | Mack et al. | |
| 4,827,484 A | 5/1989 | Cook, Jr. | |
| 4,847,849 A | 7/1989 | Steffen | |
| 4,956,845 A | 9/1990 | Otto et al. | |
| 5,050,184 A * | 9/1991 | Nelson | 372/107 |
| 5,168,194 A | 12/1992 | Littlechild et al. | |
| 5,381,432 A | 1/1995 | Kasahara | |
| 5,617,440 A | 4/1997 | Meier | |
| 5,682,399 A | 10/1997 | Nishida | |
| 5,841,218 A * | 11/1998 | Gregor et al. | 313/46 |
| 5,898,270 A * | 4/1999 | Oiye et al. | 313/570 |

FOREIGN PATENT DOCUMENTS

| | | |
|---|---|---|
| DE | 24 57 815 | 6/1976 |
| DE | 26 33 550 | 3/1977 |
| EP | 0 105 230 | 4/1984 |
| JP | 080124521 | 5/1996 |

OTHER PUBLICATIONS

Brochure, "Discharge Lamps, Lighting Edge Technologies", USHIO Inc., 47 pages, dated Oct. 2000.

(Continued)

*Primary Examiner*—Minsun O. Harvey
*Assistant Examiner*—Tuan N. Nguyen
(74) *Attorney, Agent, or Firm*—Lipsitz & McAllister LLC

(57) ABSTRACT

In order to improve a pumping light source for laser-active media comprising an outer member enclosing a gas discharge medium, a first electrode acting as a cathode and having a first electrode end located within the outer member, a second electrode acting as an anode and having a second electrode end located within the outer member and a gas discharge chamber located within the outer member between the electrode ends facing one another, in such a manner that the service life thereof is longer it is suggested that the first electrode end be essentially cooled by radiation and that a predominantly diffuse gas discharge be formed proceeding from an areally extended surface area located at the first electrode end.

27 Claims, 5 Drawing Sheets

OTHER PUBLICATIONS

Brochure, "High Performance Flash and Arc Lamps", Perkin Elmer Optoelectronics, 40 pages, published 2001.

Publication, "What is a Laser Flashlamp?", 12 pages (undated).

"The Heraeus Noblelight Technical Reference Book; The Lamp Book", 39 pages, date of publication unknown.

Tungsten Data "Electrode Tip Geometry Selection—3 pages; Tungsten Electrode Tips Sheets—2 pages; Tungsten Diameter Selection—2 pages", http://www.proffusiononline.com/tungsten/diameter.htm, Nov. 25, 2003.

Diamond Ground Products Inc., "Pre-Ground Tungsten Electrode", 4 pages, hhtp://www.diamondground.com/electrodes.html Nov. 25, 2003.

Brochure of Heraeus Amba Ltd., "Amba UV Curing Lamps" 4 pages, 2002-2003.

Robert G. Seippel, "Optoelectronics for Technology & Engineering", 5 pages, 1989.

"General Electric Flashtube Data Manual", 2 pages, undated.

"Plansee; Tungsten Material Properties and Applications" 4 pages, 1999.

W.L. Bade and J.M. Yos, Technical Report, "A Theoretical and Experimental Study of Thermionic Arc Cathodes", 208 pages, Jul. 16, 1962.

H. Maecker, "Plasmastroemungen in Lichtboegen in Folge eigenmagnetischer Kompression" pp. 198-216, 1955.

John F. Waymouth, "Analysis of Cathode-Spot Behavior in High-Pressure Discharge Lamps", J .Light & Vis. Env. vol. 6 No. 2 1982, pp. 53-64.

P. Tielemans, et al., "Electrode Temperatures in High Pressure Gas Discharge Lamps", Philips Journal of Research, vol. 38 Nos. 4/5, 1983, pp. 214-223.

G. Ecker, "Electrode Components of the Arc Discharge" 106 pages, Ergebnisse Der Exakten Naturwissenschaften, Published 1961.

* cited by examiner

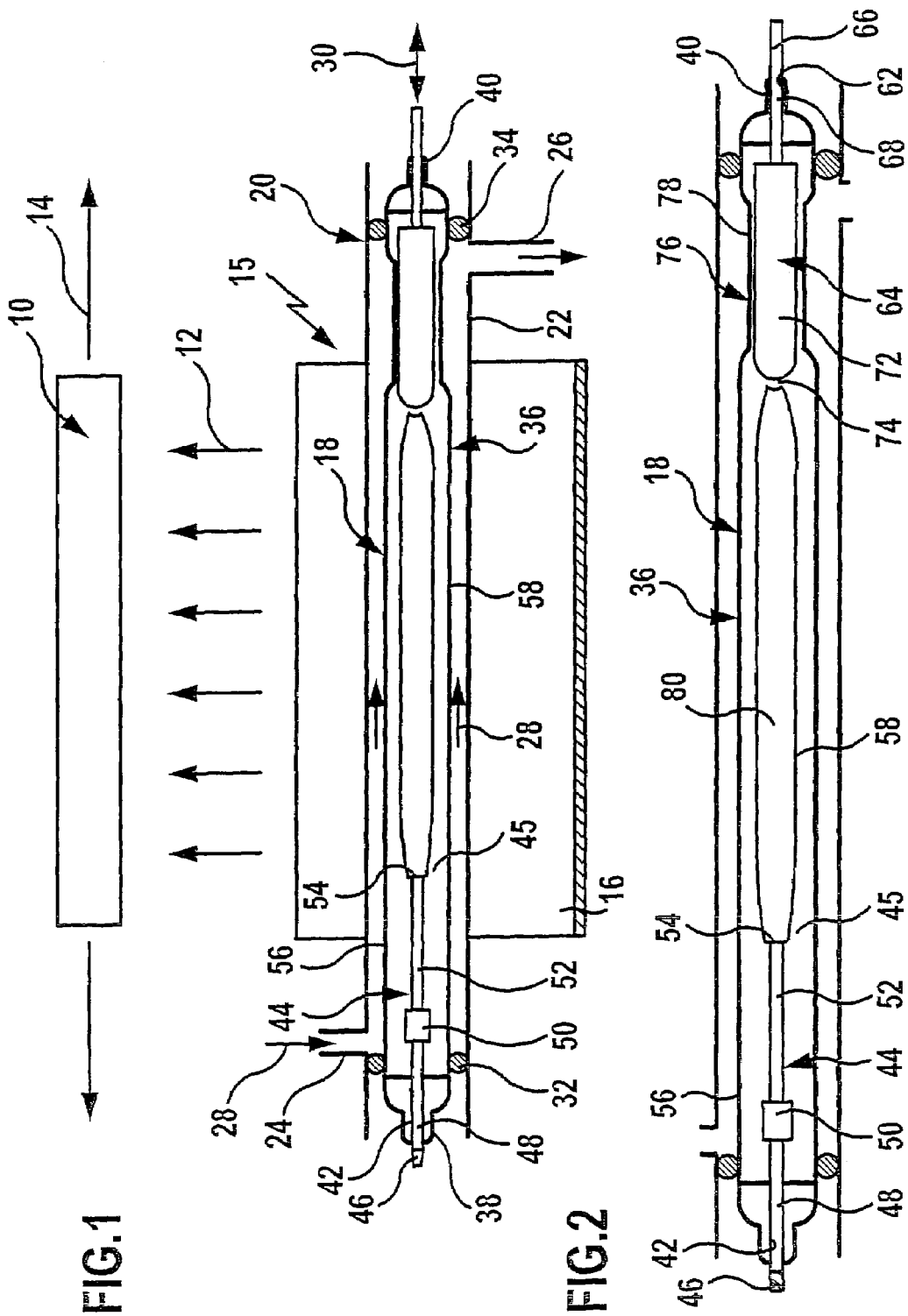

PUMPING LIGHT SOURCE FOR LASER-ACTIVE MEDIA

This application is a continuation of commonly assigned U.S. patent application Ser. No. 10/118,594 filed on Apr. 8, 2002, now abandoned which application claims priority of German patent application no. 102 08 585.4 filed on Feb. 22, 2002.

BACKGROUND OF THE INVENTION

The invention relates to a pumping light source for laser-active media, comprising an outer member enclosing a gas discharge medium, a first electrode acting as a cathode and having a first electrode end located within the outer member, a second electrode acting as an anode and having a second electrode end located within the outer member and a gas discharge chamber located within the outer member between the electrode ends facing one another.

Pumping light sources for laser-active media of this type are known from the state of the art, wherein the problem always exists that the service life of such pumping light sources is limited, namely, in particular, due to several effects which are connected to one another. These effects are vaporization or sputtering of electrode material which is deposited, in particular, on the outer member and leads to thermal stressing thereof and, in addition, stressing of the outer member due to unfavorable gas discharge procedures.

The object underlying the invention is therefore to improve a pumping light source of the generic type in such a manner that the service life thereof is longer.

SUMMARY OF THE INVENTION

This object is accomplished in accordance with the invention, in a pumping light source of the type described at the outset, in that the first electrode end is essentially cooled by radiation and that a predominantly diffuse gas discharge is formed proceeding from an areally extended surface area located at the first electrode end.

The advantage of the inventive solution is to be seen in the fact that the formation of a diffuse gas discharge, which, for its part, reduces the sputtering and vaporization of electrode material and, in addition, also favors the thermal stressing of the outer member on account of more favorable flow ratios during the diffuse gas discharge, is promoted by the radiation cooling.

As a result, the service lives of the pumping light sources may be increased considerably due to the inventive solution.

An areally extended surface area for forming the gas discharge in a predominantly diffuse mode is to be understood such that the surface area of the cathode has an appreciably greater extension than in the case of a so-called spot mode of the gas discharge, with which the gas discharge proceeds from an essentially punctiform surface area.

It is particularly advantageous for the formation of a predominantly diffuse gas discharge, i.e., a gas discharge in the diffuse mode when the surface area has essentially a uniformly high temperature. This can be achieved in a simple manner, in particular, by way of the radiation cooling of the first electrode end.

It is particularly favorable when the surface area overlaps a volume area at the first electrode end which has essentially a uniformly high temperature. Any unfavorable influencing of the composition of the material in the surface area during operation of the pumping light source may, in particular, be avoided as a result of essentially a uniformly high temperature of the entire volume area at the electrode end.

In order to ensure the formation of a diffuse gas discharge in the case of, where possible, all the operating states it is preferably provided for the surface area to be designed essentially free from steps. Such a step-free design of the surface area suppresses the tendency of the gas discharge to transfer into the spot mode and thus stabilizes the diffuse mode of the gas discharge to as great an extent as possible.

In this respect, it is not imperative for the surface area to represent a flat surface, the surface area can also be a curved surface.

A particularly favorable solution provides for the surface area to be defined by a section of a mathematical surface area extending in a continuous manner, i.e., the mathematical surface area has no point or step or other discontinuity in the section but extends in a continuous manner in order to give the gas discharge proceeding from this section no possibility or tendency to transfer into a spot mode.

The surface area, from which the diffuse gas discharge proceeds, has an appreciably large extension in relation to the cross-sectional surface area of the electrode end. The surface area preferably has an areal extension which corresponds at least to half of the cross-sectional surface area of the volume area at the first electrode end. It is even better when the surface area has an areal extension which is greater than two thirds of an average cross-sectional surface area of the volume area at the first electrode end.

Since current must automatically flow through each electrode, each electrode is guided out through the outer member to an electrical connection, wherein, as a result, heat conduction from the electrode end to the outer member automatically results. A particularly favorable solution supporting the inventive concept provides for the first electrode end to be coupled to the outer member by way of heat conduction only via the electrode extending to an electrode opening in the outer member and, therefore, achieves essentially a uniformly high temperature in the surface area extended over the electrode end so that the predominantly diffuse gas discharge is formed proceeding from this surface area. This means that in this solution the bodily heat conduction from the electrode end to the outer member, which is, for its part, cooled, relative to the radiation cooling can be disregarded. This means that every solution is, in particular, excluded, with which the electrode experiences cooling by way of heat conduction near to the electrode end due to bodily contact with the outer member.

The heat conduction in the electrode to the outer member may be suppressed particularly well when the extension of the first electrode between an electrode opening of the outer member and the first electrode end relative to the average cross section of the first electrode is such that the extension is greater than ten times the average cross section of the electrode and so the heat conduction can be reduced solely as a result of this to a degree which can be disregarded in comparison with the radiation cooling.

It is especially favorable, in particular, when in the first electrode the heat resistance between the first electrode end and the electrode opening is at least 10° C. per Watt.

With respect to the material to be used at the first electrode end, no further details have been given in conjunction with the preceding explanations concerning the inventive solution. It would, for example, be conceivable to use ceramics as material which must, however, have a sufficiently high conductivity for conducting current in order to keep the heating up of the electrode by the current supplied as low as possible. A particularly favorable solution does, however, provide for the first electrode end to consist of a high melting metal.

With respect to the selection of the material for the first electrode end, it has proven to be particularly favorable when the material forming the first electrode end is provided with a dope additive which leads during operation to a lower electrode operating temperature than in the case of the undoped material. When the material is, in this respect, a metal, the dope additive has to be selected such that the electrode operating temperature, i.e., the temperature of the electrode during a burning gas discharge is lower than in the case of the undoped material in order to suppress any vaporization or sputtering of the material to as great an extent as possible.

In this respect, it is particularly expedient when the electrode operating temperature of the electrode end is lower than the melting temperature of the material of the electrode end in order to likewise prevent vaporization or sputtering of the material to a great extent.

A particularly preferred solution for the material of the first electrode end provides for this to consist of tungsten, wherein the tungsten is preferably doped with a material, the work function of which for electrons is smaller than that of pure tungsten.

The most varied of materials can be considered as doping materials. These materials may, for example, be oxides of the rare earths.

It has proven to be particularly suitable when the first electrode end consists of tungsten doped with at least 0.1% by weight of lanthanum.

With respect to the maximum doping, it is particularly favorable when the first electrode end consists of tungsten doped at the most with 5% by weight of lanthanum.

With respect to the design of the first electrode itself, the most varied of solutions are conceivable. One particularly preferred solution provides for the first electrode to have a holding section passing through the electrode opening and consisting of a material which can be wetted by the material of the outer member and for an end section supporting the electrode end to adjoin this holding section. The advantage of this solution is to be seen in the fact that, with it, it is possible to select the material of the holding section such that as secure and sealed a connection as possible to the outer member can be provided in the region of the electrode opening and, on the other hand, to select the material of the end section such that the gas discharge burns in a suitable manner and vaporization and sputtering are avoided.

In order to connect the holding section and the end section, the most varied of possibilities are conceivable.

One possibility provides for the holding section passing through the electrode opening and the end section to be connected in a form-locking manner. Such a form-locking connection is designed, for example, such that one section engages in a recess of the other section. A form-locking connection which is as simple as possible is achieved in that the connection of the holding section and the end section is brought about via a sleeve-like form-locking member.

Alternatively or in addition to the form-locking connection of holding section and end section it is preferably provided for the holding section of the first electrode passing through the electrode opening and the end section to be connected to one another by way of joining. A joining connection of this type could, for example, be a hard solder connection or also a weld connection.

Laser welding can preferably be provided for the production of the joining connection.

With respect to the shape of the first electrode, no further details have been given in conjunction with the preceding embodiments. For example, any optional shapes are, in principle, conceivable. One shape of the first electrode which is favorable, in particular, on account of its simplicity provides for the first electrode to extend essentially as a pin-like member between the electrode opening and the first electrode end.

In this respect, the end section can, in principle, be of a different design. In the simplest case, it is also provided for the end section to be designed as a pin-like member.

Furthermore, it is provided in the simplest case for the first electrode end to have approximately the same cross section as the pin-like member.

Alternatively thereto, it is, however, also conceivable for the first electrode end to have a cross section increased in size in comparison with the pin-like member. Such an enlarged cross section may be achieved, for example, in that the end section is designed as a thickened member.

With respect to the start of the gas discharge, no further details have so far been given. One particularly advantageous embodiment provides for a surface discontinuity to be provided at the first electrode end for forming a gas discharge starting in a punctiform manner at this discontinuity. As a result, the start of the gas discharge and, therefore, the triggering of the pumping light source are facilitated and, in particular, a start of the gas discharge at a defined point of the electrode end can be achieved as a result and so the starting conditions may be optimized.

With respect to the explanations concerning the preceding embodiments, it has merely been defined that the first electrode is intended to act as a cathode. This definition of the first electrode merely relates to the electrical connection of the pumping light source. If the pumping light source is operated with direct current, one and the same electrode always remains the cathode. If, on the other hand, the pumping light source is operated with alternating current, the cathode changes and so each of the two electrodes is one time cathode and one time anode. As a result, the aforementioned features referring to the first electrode relate to both electrodes of the pumping light source.

In this respect, the pumping light source may preferably be operated in a power range of approximately 0.1 kW to approximately 10 kW and in this power range the inventive advantages can be achieved with the inventive features.

With respect to operation of a pumping light source, in accordance with one of the preceding embodiments, no further details have been given in conjunction with the preceding solution, in particular, with respect to the starting procedure.

It would, for example, be conceivable to cause the pumping light source to start from the beginning with a diffuse gas discharge.

It is, however, particularly favorable when the gas discharge is started as an essentially punctiform gas discharge and, subsequently, transfers into a predominantly diffuse gas discharge. With a process of this type, the gas discharge may be started in a particularly simple manner and, in particular, defined manner but the desired diffuse gas discharge may then, however, be achieved.

Additional features and advantages of the inventive solution are the subject matter of the following description as well as the drawings illustrating several embodiments.

BRIEF DESCRIPTION OF THE DRAWINGS

FIG. 1 shows a schematic illustration of a laser amplifying system with an inventive pumping light source;

FIG. 2 shows an enlarged illustration of a first embodiment of an inventive pumping light source;

DETAILED DESCRIPTION OF THE INVENTION

Figure 3:
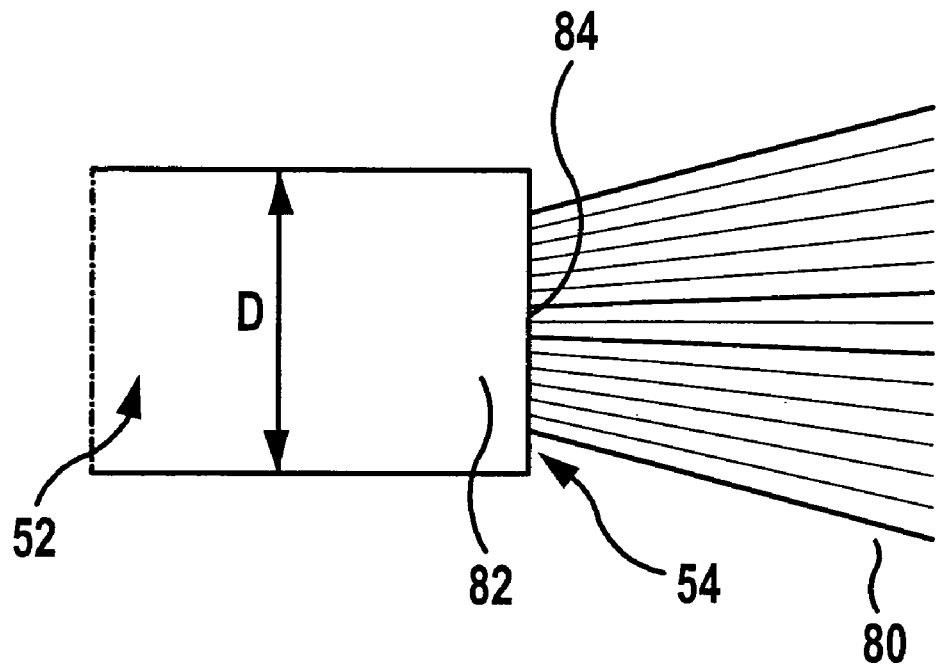
FIG. 3 shows an enlarged illustration of a first electrode end of the first embodiment of the inventive pumping light source.

A laser amplifying system illustrated schematically in FIG. 1 comprises a laser-active medium 10, for example, a solid-state rod, in which a population inversion can be generated by way of optical pumping with pumping light 12, this inversion leading in the laser-active medium to the amplification of laser radiation 14 propagating, for example, transversely to the pumping light 12.

The pumping light 12 can be generated by a pumping light source designated as a whole as 15 and is focused onto the laser-active medium 10, in addition, by an optical focusing means 16.

The pumping light source 15 comprises a gas discharge unit 18 which is enclosed by a cooling unit 20, wherein the cooling unit 20 is formed by an outer casing 22, preferably consisting of a suitable glass, which is optically transparent for the pumping light 12 and is provided, on the one hand, with an inlet 24 and, on the other hand, with an outlet 26 for a cooling medium 28 guided in the interior of the outer casing 22.

In this respect, the gas discharge unit 18 is arranged in the cooling unit 20 such that this preferably has the cooling medium 28 flowing around it over its entire circumference, wherein the cooling medium 28 preferably flows along an outer side of the gas discharge unit 18 in a longitudinal direction 30 thereof.

In this respect, for the sealed closure between the outer casing 22 and the gas discharge unit 18, a respective seal 32 and 34 is preferably provided between the outer casing 22 and an outer member 36 of the gas discharge unit 18 at the respective ends of the area of the outer casing 22, through which the cooling medium 28 flows in the longitudinal direction 30.

The outer member 36 is likewise formed from a material, preferably a suitable glass, which is optically transparent for the pumping light 12, and extends within the outer casing 22 of the cooling unit 20 in the longitudinal direction 30 from a first end area 38 to a second end area 40.

A first electrode opening 42, through which a first electrode 44 is guided through the outer member 36 in a sealing manner into an interior 45 enclosed by the outer member 36, is provided at the first end area 38.

The first electrode 44 has an electrical connection section 46 which is located outside the outer member 36 and proceeding from which a holding section 48 of the first electrode 44 extends through the electrode opening 42 and is held by this relative to the outer member 36, wherein to achieve a gas-tight closure a connection between the material of the outer member 36 and the material of the holding section 48 is preferred, with which the material of the outer member 36 wets the material of the holding section 48.

The holding section 48 is connected at its end located opposite the connection section 46 by means of a connection 50 to a front end section 52 of the first electrode 44 which then extends as far as the front electrode end 54.

In this respect, the part of the holding section 48 extending beyond the electrode opening 42 as well as the connection 50 and the front end section 52 of the first electrode 44 already extend in the interior 45 free from contact in relation to the outer member 36 and, preferably, at a distance from it which is approximately equal in all directions, wherein the outer member 36 has in its electrode section 56 engaging around the first electrode 44 a cross section which is approximately equal to a cross section of the outer member 36 in a gas discharge section 58 thereof.

In the second end area 40, an electrode opening 62 is likewise provided for a second electrode which is designated as a whole as 64 and likewise has an electrical connection section 66, proceeding from which a holding section 68 extends through the electrode opening 62 and projects beyond this into the interior of the outer member 36 and bears a front end section designated as a whole as 72.

The front end section 72 could be designed, for example, in the same way as in the case of the first electrode 44 but in the embodiment illustrated the front end section 42 is of a thickened configuration and extends as far as a second electrode end 74.

In order to cool the front end section 72 of the second electrode 64, an electrode section 76 of the outer member 36 enclosing the second electrode 64 is provided with a recessed area 78 which has such a cross-sectional narrowing that the recessed area 78 abuts on the front end section 72 and contributes to the cooling thereof via heat conduction.

During operation of the gas discharge unit 18, a gas discharge designated as a whole as 80 is formed between the first electrode end 54 and the second electrode end 74, wherein in the embodiment illustrated the first electrode end 54 represents the cathode while the second electrode end 74 forms the anode.

On account of the fact that the first electrode end 54 is in bodily contact with the outer member 36 of the gas discharge unit 18 only via the extension of the first electrode 44 from the electrode opening 42 as far as the first electrode end 54, the cooling of the first electrode end 54 resulting via this bodily contact may be reduced due to corresponding dimensioning of the heat-conductive cross sections in the holding section 48 as well as in the front end section 52 so that the electrode end 54 is cooled essentially only by radiation cooling and a volume area 82 is formed in the region of the first electrode end 54 which has essentially a uniformly high temperature which is caused, on the one hand, by the heat input on account of the gas discharge 80 which is formed and, on the other hand, by the radiation cooling already mentioned and the cooling via heat conduction to the electrode opening 42 which has already been mentioned and occurs to a slight extent.

The volume area 82 therefore has, for its part, a surface area 84 which likewise has essentially a uniformly high temperature and from which the gas discharge 80 proceeds in the form of a gas discharge 80 in the diffuse mode, wherein the diffuse mode means that the gas discharge, in contrast to the spot mode, does not start in a more or less punctiform manner at the electrode end 54 but rather in the form of an areal start, determined by the surface area 84, wherein the surface area 84 has an extension which corresponds at least to half of a cross-sectional surface area of the electrode 44 in the region of the electrode end 54, even better at least two thirds of the cross-sectional surface area which is determined, for example, in the case of a round cross section of the electrode end 54 by the diameter D of the front end section 52.

In this respect, the surface area 84 is preferably of a step-free design, i.e., it has no points or sharp edges.

Figure 4:
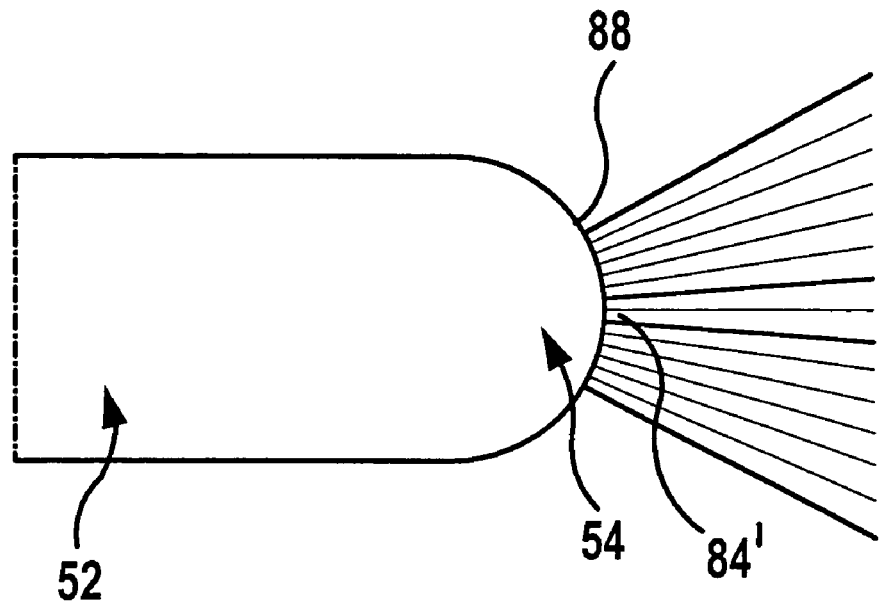
FIG. 4 shows an illustration of the electrode end of a second embodiment of an inventive pumping light source.

However, it is also conceivable, as illustrated in FIG. 4 in a second embodiment, to provide as surface area 84' a section from an optional mathematical surface 88, for example, a spherical cap which extends in a continuous manner, wherein it is ensured due to the continuous extension that, likewise, no corners, edges or points occur in the surface area 84' which would give the gas discharge 80 the possibility of transferring from the diffuse mode into the spot mode.

In order to keep the cooling of the volume area 82 by way of heat conduction as slight as possible, it is preferably provided for the heat resistance in the first electrode 44 between the first hot electrode end 54 and the cooled electrode opening 42 to be at least 10° C./W, even better to be greater. This may be realized particularly favorably in that the average cross section of the first electrode 44 between the first electrode end 54 and the electrode opening 42 is smaller than one tenth of the distance between the first electrode end 54 and the electrode opening 42.

With respect to the material in the region of the first electrode end, tungsten is preferably used as high melting metal.

The tungsten is thereby doped with a material which leads during operation to as low an operating temperature as possible in the surface area 84, preferably to an operating temperature which is lower than that of the undoped tungsten. Such temperatures are normally below 3000° C., preferably in the order of magnitude of approximately 2500° C.

Lanthanum has proven to be expedient as doping material for the tungsten, wherein the doping can be in the range of 0.1% by weight to 5% by weight.

Since the doping is decisive for the operation of the gas discharge and the formation of the diffuse mode only in the region of the front end section 52, the electrode 44 is, as already illustrated in FIGS. 1 and 2, subdivided into the front end section 52 and the holding section 48.

The holding section 48 has, with respect to its material, no influence on the gas discharge but, on the other hand, is decisive for as permanent and stable a connection as possible to the electrode opening 42.

In this respect, the holding section 48 is preferably produced from tungsten which need not have any lanthanum doping.

Figure 5:
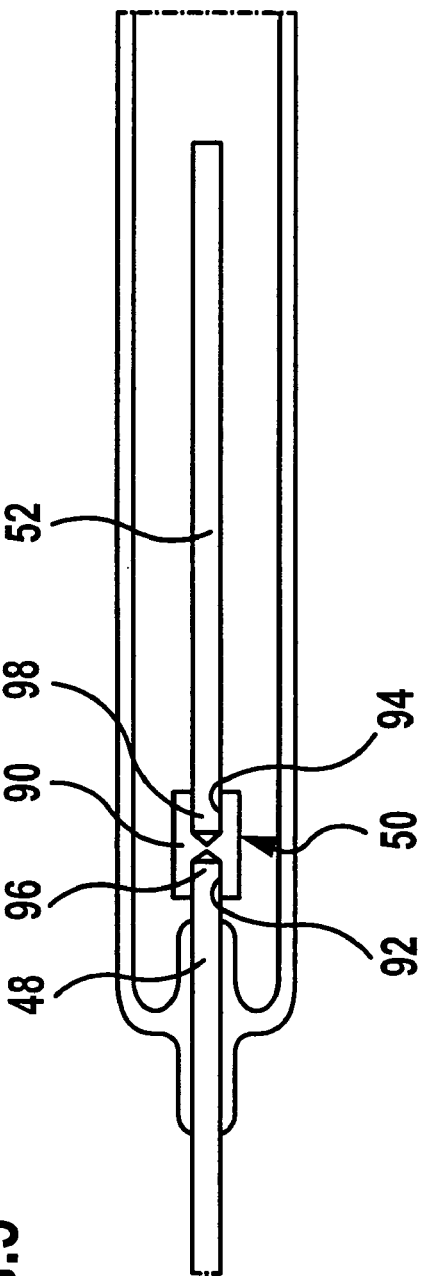
FIG. 5 shows a detail of an enlarged sectional illustration of a first electrode of a third embodiment of an inventive pumping light source.

In order to ensure a permanent connection between the front end section 52 and the holding section 48, the connection 50 in a third embodiment illustrated in FIG. 5 is preferably formed by a sleeve 90 which is provided with two bores, namely a bore 92 for an end 96 of the holding section 48 and a bore 94 for an end 98 of the front end section 52, into which these engage and are, therefore, already connected in a form-locking manner. In addition, a joining connection by way of soldering or welding is preferably produced.

Figure 6:
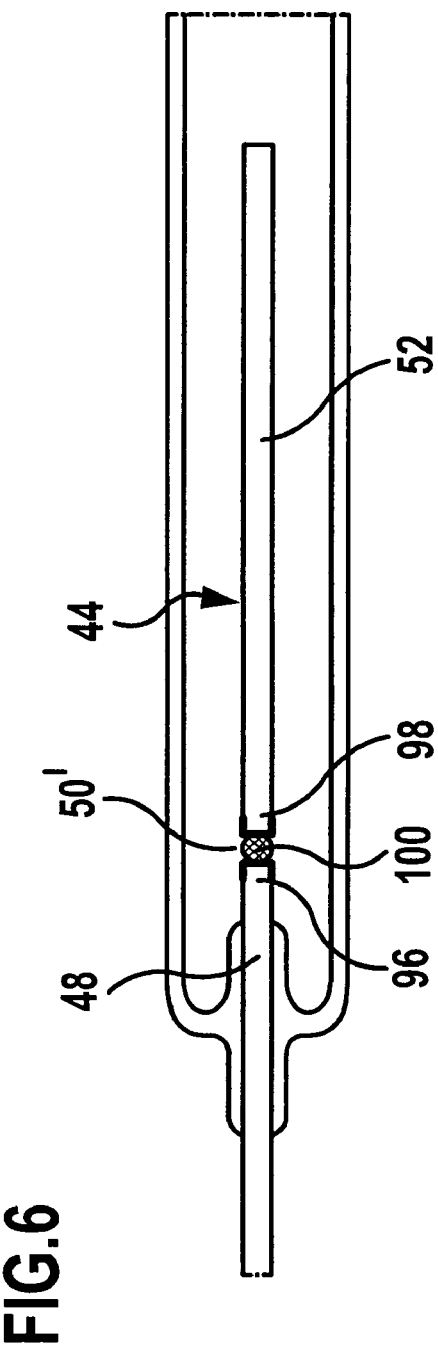
FIG. 6 shows an illustration of the first electrode similar to FIG. 5 of a fourth embodiment of an inventive pumping light source.

Alternatively thereto, it is, however, also conceivable, as illustrated in FIG. 6 for a fourth embodiment, to provide the connection 50' between the holding section 48 and the front end section 52 in the form of a welding of the ends 96 and 98 abutting on one another.

Figure 7:
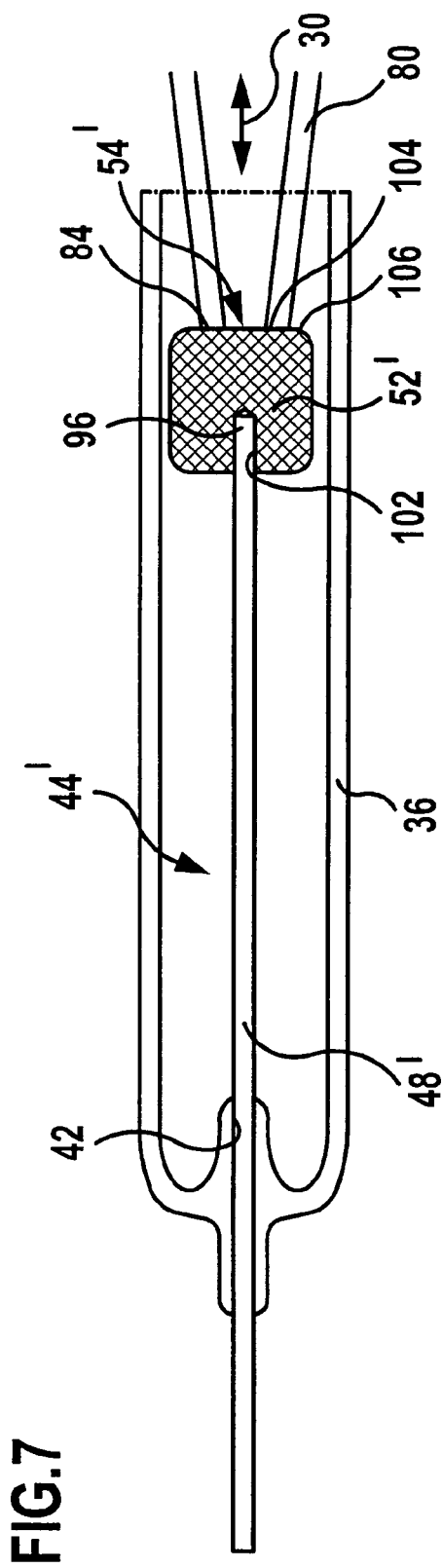
FIG. 7 shows an illustration of the first electrode similar to FIG. 5 of a fifth embodiment of an inventive pumping light source.

In a fifth embodiment, illustrated in FIG. 7, the holding section 48' of the first electrode 44' extends not only through the electrode opening 42 of the outer member 36 but essentially as far as close to the electrode end 54' which, in this case, is formed by a front end section 52' of the electrode 44' which has an enlarged cross section.

As a result, the heat conduction from the electrode end 54' to the electrode opening 42 via the small cross section of the holding section 48' may be reduced but due to the large cross section of the front end section 52' at the first electrode end 54' as large a surface as possible may be created and so the surface area 84, from which the diffuse gas discharge 80 proceeds, can also have a very large extension in order to ensure the formation of the diffuse mode of the gas discharge 80.

In this respect, the front end section 52 can, as illustrated in FIG. 7, have the shape of a piece of a cylinder which is arranged coaxially to the holding section 48', for example, in that the holding section 48' engages with its end 96 in a bore 102 in the front end section 52'.

The front end section 52' thus has an end face 104 which faces the gas discharge 80 and extends transversely, in particular, at right angles to the longitudinal direction 30 and, therefore, also in relation to the holding section 48'.

In order to facilitate starting of the gas discharge, a surface discontinuity 106, for example, a projecting point is provided on the front end face 104 facing the gas discharge 80, this point being located, however, outside the surface area 84 and serving the purpose that, during the start of the gas discharge, this begins first of all in the spot mode at the surface discontinuity 106 and, subsequently, transfers into the diffuse gas discharge proceeding from the surface area 84.

As a result, starting of the gas discharge can be made considerably easier and, in particular, provided in a defined manner at a location, at which an easier transfer into a diffuse gas discharge is possible.

For example, it would also be conceivable to guide the surface discontinuity 106 in a ring shape around the surface area 84.

Alternatively to the provision of a point, such a surface discontinuity can, however, also be provided as a recess, thereby forming an edge, or as a shoulder, thereby forming an edge.

Figure 8:
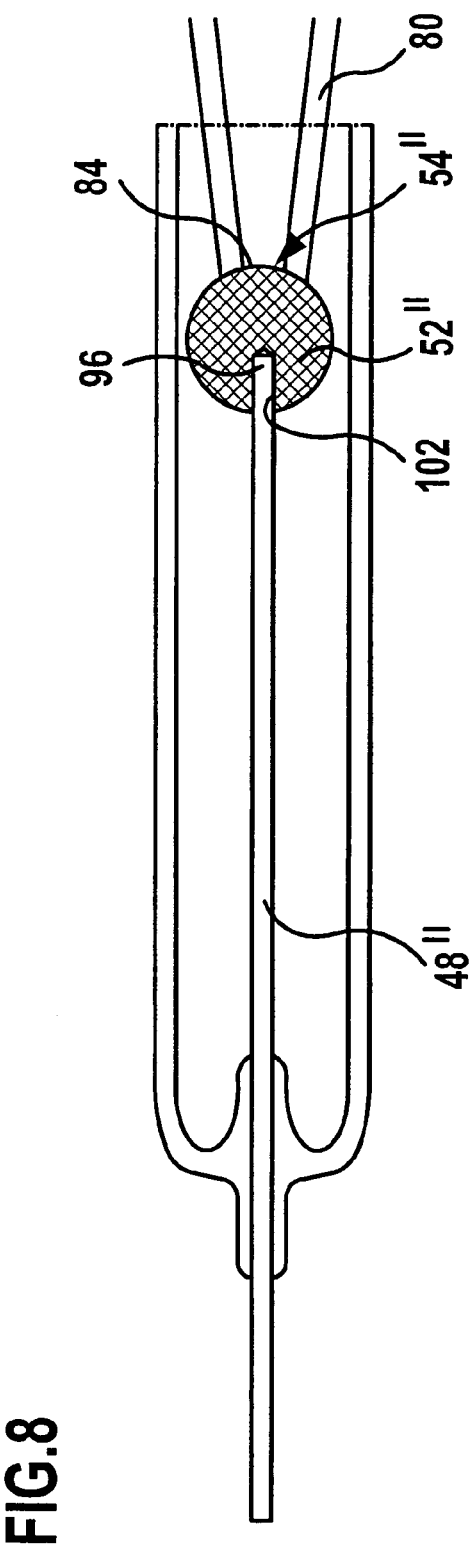
FIG. 8 shows an illustration of the first electrode similar to FIG. 5 of a sixth embodiment of an inventive pumping light source.

In a sixth embodiment, illustrated in FIG. 8, the front end section 52" is designed as a sphere with a diameter which is considerably greater than the diameter of the holding section 48" so that at the electrode end 54" a mathematical spherical cap surface extending in a continuous manner is available for the formation of the extensive surface area 84, from which the diffuse gas discharge 80 proceeds.

Figure 9:
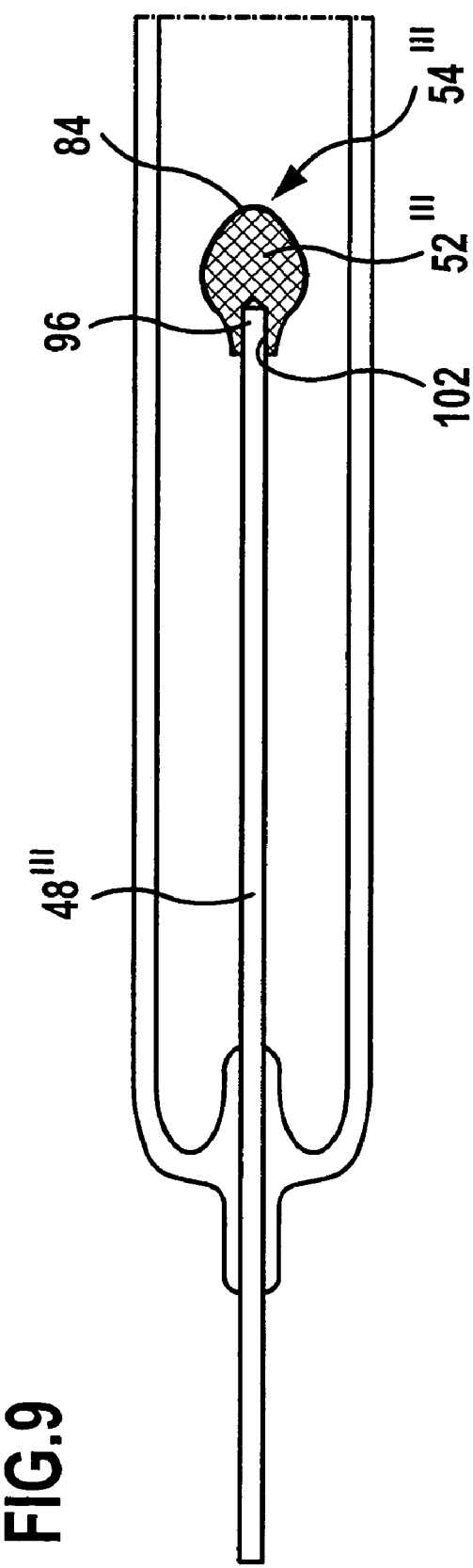
FIG. 9 shows an illustration of the first electrode of a seventh embodiment of an inventive pumping light source.

In a seventh embodiment, illustrated in FIG. 9, the front end section 52''' is designed as a member shaped elliptically in the longitudinal cross section and rotationally symmetric to the holding section 48''' of a pin-like design so that an extensive surface area 84, from which the diffuse gas discharge 80 proceeds, can likewise be formed at the electrode end 54''', wherein the surface area 84 represents a section from the continuous mathematical surface area in the region of the end of an ellipse.

In all the embodiments 2 to 7 following the first embodiment, reference is made in full to the explanations concerning the first embodiment insofar as these embodiments are identical to the first embodiment and the same parts are used as in the first embodiment.

What is claimed is:

1. Pumping light source for laser-active media comprising:
    an outer member enclosing a gas discharge medium, said outer member being optically transparent,
    a first electrode acting as a cathode and having a first electrode end located within the outer member, the first electrode end being essentially cooled by thermal radiation,
    a second electrode acting as an anode and having a second electrode end located within the outer member,
    said outer member having a gas discharge section extending between the electrode ends facing one another, and
    said pumping light source being operated with a gas discharge having a predominantly diffuse arc attachment at the first electrode proceeding from an areally extended surface area located at the first electrode end, said gas discharge generating pumping light exiting through said gas discharge section,
    wherein the surface area has an extension greater than two thirds of an average cross-sectional surface area of the volume area at the first electrode end.

2. Pumping light source as defined in claim 1, wherein the surface area has essentially a uniformly high temperature.

3. Pumping light source as defined in claim 1, wherein the surface area overlaps a volume area at the first electrode end, said volume area having essentially a uniformly high temperature.

4. Pumping light source as defined in claim 1, wherein the surface area is essentially free from steps.

5. Pumping light source as defined in claim 4, wherein the surface area is defined by a section from a mathematical surface area extending in a continuous manner.

6. Pumping light source as defined in claim 1, wherein the first electrode end is coupled to the outer member by way of heat conduction only via the electrode extending to an electrode opening in the outer member.

7. Pumping light source as defined in claim 1, wherein the first electrode end consists of a high melting metal.

8. Pumping light source as defined in claim 1, wherein the first electrode extends essentially as a pin-like member between the electrode opening and the first electrode end.

9. Pumping light source as defined in claim 8, wherein the first electrode end has approximately the same cross section as the pin-like member.

10. Pumping light source as defined in claim 1, wherein the end section of the first electrode is designed as a pin-like member.

11. Pumping light source as defined in claim 10, wherein the first electrode end has a cross section increased in size in comparison with the pin-like member.

12. Pumping light source as defined in claim 11, wherein the end section is thickened to form the first electrode end.

13. Pumping light source as defined in claim 1, wherein a surface discontinuity is provided at the first electrode end for forming a gas discharge starting in a punctiform manner at this discontinuity.

14. Pumping light source as defined in claim 13, wherein the surface discontinuity is located outside the surface area.

15. Pumping light source as defined in claim 1, wherein this operates in the electric power range of approximately 0.1 kW to approximately 10 kW.

16. Process for the operation of a pumping light source as defined claim 1, wherein the gas discharge is started with an essentially punctiform arc attachment at the first electrode and subsequently transfers into a predominantly diffuse arc attachment.

17. Pumping light source for laser-active media comprising:
    an outer member enclosing a gas discharge medium, said outer member being optically transparent,
    a first electrode acting as a cathode and having a first electrode end located within the outer member, the first electrode end being essentially cooled by thermal radiation,
    a second electrode acting as an anode and having a second electrode end located within the outer member,
    said outer member having a gas discharge section extending between the electrode ends facing one another, and
    said pumping light source being operated with a gas discharge having a predominantly diffuse arc attachment at the first electrode proceeding from an areally extended surface area located at the first electrode end, said gas discharge generating pumping light exiting through said gas discharge section,
    wherein the extension of the first electrode between an electrode opening of the outer member and the first electrode end relative to the average cross section of the first electrode is such that the extension is greater than ten times the average cross section of the first electrode.

18. Pumping light source as defined in claim 17, wherein in the first electrode the heat resistance between the first electrode end and the electrode opening is at least 10° C./W.

19. Pumping light source for laser-active media comprising:
    an outer member enclosing a gas discharge medium, said outer member being optically transparent,
    a first electrode acting as a cathode and having a first electrode end located within the outer member, the first electrode end being essentially cooled by thermal radiation,
    a second electrode acting as an anode and having a second electrode end located within the outer member,
    said outer member having a gas discharge section extending between the electrode ends facing one another, and
    said pumping light source being operated with a gas discharge having a predominantly diffuse arc attachment at the first electrode proceeding from an areally extended surface area located at the first electrode end, said gas discharge generating pumping light exiting through said gas discharge section,
    wherein:
    material forming the first electrode end is provided with a dope additive leading during operation to a lower electrode operating temperature than in the case of the undoped material, and
    in the first electrode the heat resistance between the first electrode end and the electrode opening is at least 10C./W.

20. Pumping light source for laser-active media comprising:
    an outer member enclosing a gas discharge medium, said outer member being optically transparent, a first electrode acting as a cathode and having a first electrode end located within the outer member, the first electrode end being essentially cooled by thermal radiation, a second electrode acting as an anode and having a second electrode end located within the outer member, said outer member having a gas discharge section extending between the electrode ends facing one another, and said pumping light source being operated with a gas discharge having a predominantly diffuse arc attachment at the first electrode proceeding from an areally extended surface area located at the first electrode end, said gas discharge generating pumping light exiting through said gas discharge section, wherein:

the electrode operating temperature of the first electrode end is lower than the melting temperature of the material of the electrode end, and in the first electrode the heat resistance between the first electrode end and the electrode opening is at least 10° C./W.

21. Pumping light source for laser-active media comprising:

an outer member enclosing a gas discharge medium, said outer member being optically transparent, a first electrode acting as a cathode and having a first electrode end located within the outer member, the first electrode end being essentially cooled by thermal radiation, a second electrode acting as an anode and having a second electrode end located within the outer member, said outer member having a gas discharge section extending between the electrode ends facing one another, and said pumping light source being operated with a gas discharge having a predominantly diffuse arc attachment at the first electrode proceeding from an areally extended surface area located at the first electrode end, said gas discharge generating pumping light exiting through said gas discharge section, wherein the first electrode end consists of tungsten doped with at most 5% by weight of an oxide of a rare earth material having a work function for electrons smaller than that of pure tungsten.

22. Pumping light source for laser-active media comprising:

an outer member enclosing a gas discharge medium, said outer member being optically transparent, a first electrode acting as a cathode and having a first electrode end located within the outer member, the first electrode end being essentially cooled by thermal radiation, a second electrode acting as an anode and having a second electrode end located within the outer member, said outer member having a gas discharge section extending between the electrode ends facing one another, said pumping light source being operated with a gas discharge having a predominantly diffuse arc attachment at the first electrode proceeding from an areally extended surface area located at the first electrode end, said gas discharge generating pumping light exiting through said gas discharge section, and the first electrode end consisting of tungsten doped with at least 0.1% by weight of lanthanum.

23. Pumping light source as defined in claim 22, wherein the first electrode end consists of tungsten doped at the most with 5% by weight of lanthanum.

24. Pumping light source for laser-active media comprising:

an outer member enclosing a gas discharge medium, said outer member being optically transparent, a first electrode acting as a cathode and having a first electrode end located within the outer member, the first electrode end being essentially cooled by thermal radiation, a second electrode acting as an anode and having a second electrode end located within the outer member, said outer member having a gas discharge section extending between the electrode ends facing one another, said pumping light source being operated with a gas discharge having a predominantly diffuse arc attachment at the first electrode proceeding from an areally extended surface area located at the first electrode end, said gas discharge generating pumping light exiting through said gas discharge section, the first electrode hare having a holding section passing through the electrode opening, said holding section consisting of a material wettable by the material of the outer member, and an end section supporting the first electrode end adjoining said holding section.

25. Pumping light source as defined in claim 24, wherein the holding section passing through the electrode opening and the end section are connected in a form-locking manner.

26. Pumping light source as defined in claim 25, wherein the connection of the holding section and the end section is brought about via a sleeve-like form-locking member.

27. Pumping light source as defined in claim 24, wherein the holding section of the first electrode passing through the electrode opening and the end section are connected to one another by way of joining.

* * * * *

UNITED STATES PATENT AND TRADEMARK OFFICE
CERTIFICATE OF CORRECTION

PATENT NO. : 7,050,473 B2  
APPLICATION NO. : 10/791664  
DATED : May 23, 2006  
INVENTOR(S) : Ifflaender Page 1 of 1

It is certified that error appears in the above-identified patent and that said Letters Patent is hereby corrected as shown below:

Column 12, line 34:

Delete the word "hare" before the word "having"

Signed and Sealed this

Twenty-second Day of August, 2006

JON W. DUDAS  
*Director of the United States Patent and Trademark Office*